United States Patent
Campbell

(10) Patent No.: US 6,513,133 B1
(45) Date of Patent: Jan. 28, 2003

(54) UNIFORMLY DISTRIBUTED INDUCTION OF EXCEPTIONS FOR TESTING COMPUTER SOFTWARE

(75) Inventor: David G. Campbell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/342,961

(22) Filed: Jun. 29, 1999

(51) Int. Cl.7 .................................................. G06F 11/30
(52) U.S. Cl. ............................ 714/38; 714/41; 717/131
(58) Field of Search ............................... 714/38–41, 45; 717/124, 125, 127, 128, 131–132, 133; 712/227, 244

(56) References Cited

U.S. PATENT DOCUMENTS 5,671,352 A * 9/1997 Subrahmaniam et al. ..... 714/33
6,061,643 A * 5/2000 Walker et al. ............... 702/123
6,330,692 B1 * 12/2001 Kamuro et al. ................ 714/38

OTHER PUBLICATIONS

Bieman et al., "Using Fault Injection to Increase Software Test Coverage", Apr. 1996, IEEE, pp. 166–174.*

* cited by examiner

Primary Examiner—Scott Baderman
(74) Attorney, Agent, or Firm—Woodcock Washburn LLP

(57) ABSTRACT

A method, apparatus, software and data structure are disclosed for more efficient fault testing of system software. A table is used to track routines that have been subjected to induced faults. As call paths are encountered in operating the system software, the table is consulted to determine which call paths have not yet been subjected to induced exceptions. These call paths are then subjected to the exceptions, thereby improving uniformity of distribution of induced exceptions.

30 Claims, 3 Drawing Sheets

UNIFORMLY DISTRIBUTED INDUCTION OF EXCEPTIONS FOR TESTING COMPUTER SOFTWARE

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1999, Microsoft, Inc.

TECHNICAL FIELD OF THE INVENTION

The present invention pertains generally to fault testing of computer software, and more particularly to fault testing system software for handling of uncommonly occurring conditions.

BACKGROUND OF THE INVENTION

System software has traditionally been complex to test. The operational system must be able to handle a variety of exceptional conditions that, while occurring only occasionally under typical operating conditions, are potentially serious. Some of these conditions include, for example, disk I/O failure, network communications timeout or failure, and out-of-memory failure. Because these conditions occur so rarely, conventional strategies for testing the ability of the system software to handle these conditions have involved large scale stress testing or artificial fault induction. In large scale stress testing, the operating system is used for extended periods of time so that the exceptional conditions are likely to occur naturally. A significant drawback to this approach is the substantial time required for testing.

Artificial fault induction avoids this problem to some extent by simulating faults. For example, random requests to low level routines can be failed. Alternatively, a routine can be failed after a predetermined number of calls to the routine. While fault induction approaches reduce the time involved in testing system software, they are susceptible to a phenomenon known as call path skew. For example, a routine that can throw a low level exception can be called from two other routines A and B, of which routine A is called much more frequently than routine B. If routine B cannot properly handle the exception thrown by the low level routine, conventional fault induction approaches may miss throwing the exception when called by routine B because routine B is called so infrequently. Some approaches use a random number generator to limit the frequency with which the called routine throws exceptions, allowing the system to proceed effectively while under the test workload. Even with this limiting measure, however, most exceptions are thrown in the context of routines that are called most frequency. Functions that are not called often receive few, if any, exceptions to handle.

Thus, conventional fault induction approaches may fail to detect the inability of an infrequently called routine to handle exceptional operating conditions. Accordingly, a need continues to exist for a system that can detect such errors in even infrequently called program modules.

SUMMARY OF THE INVENTION

According to various example implementations of the invention, there is provided an efficient system for fault testing system software, as described herein below. In particular, the invention provides, among other things, for the use of a hash table or other data structure for tracking routines that have been subjected to induced faults and exceptions during testing of the system software. The hash table or other tracking mechanism is consulted as routines are encountered while running a test workload to determine which routines have not yet been subjected to induced exceptions. These routines are then subjected to induced exceptions.

Because the routines that have been subjected to induced exceptions are tracked, the system can induce a more uniform distribution of exceptions for all routines, especially those that are encountered only rarely under typical operating conditions. Thus, the system is able to ensure proper exception handling by all routines.

In a particular implementation, a ring buffer is used to track routine paths and to store associated parameters in order to preserve events preceding a failure to handle an induced exception or fault properly for debugging.

In another particular implementation, program addresses are used to uniquely identify each path that has been subjected to an induced exception.

Another implementation is directed to a method for testing fault tolerance by executing the computer program, maintaining a record of paths in the computer program that have been subjected to an induced exception, and inducing an exception if a path currently being executed has not already been subjected to an induced exception.

Still other implementations are directed to computer-readable media and computer arrangements for performing these methods.

The above summary of the present invention is not intended to describe every implementation of the present invention. The figures and the detailed description that follow more particularly exemplify these implementations.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
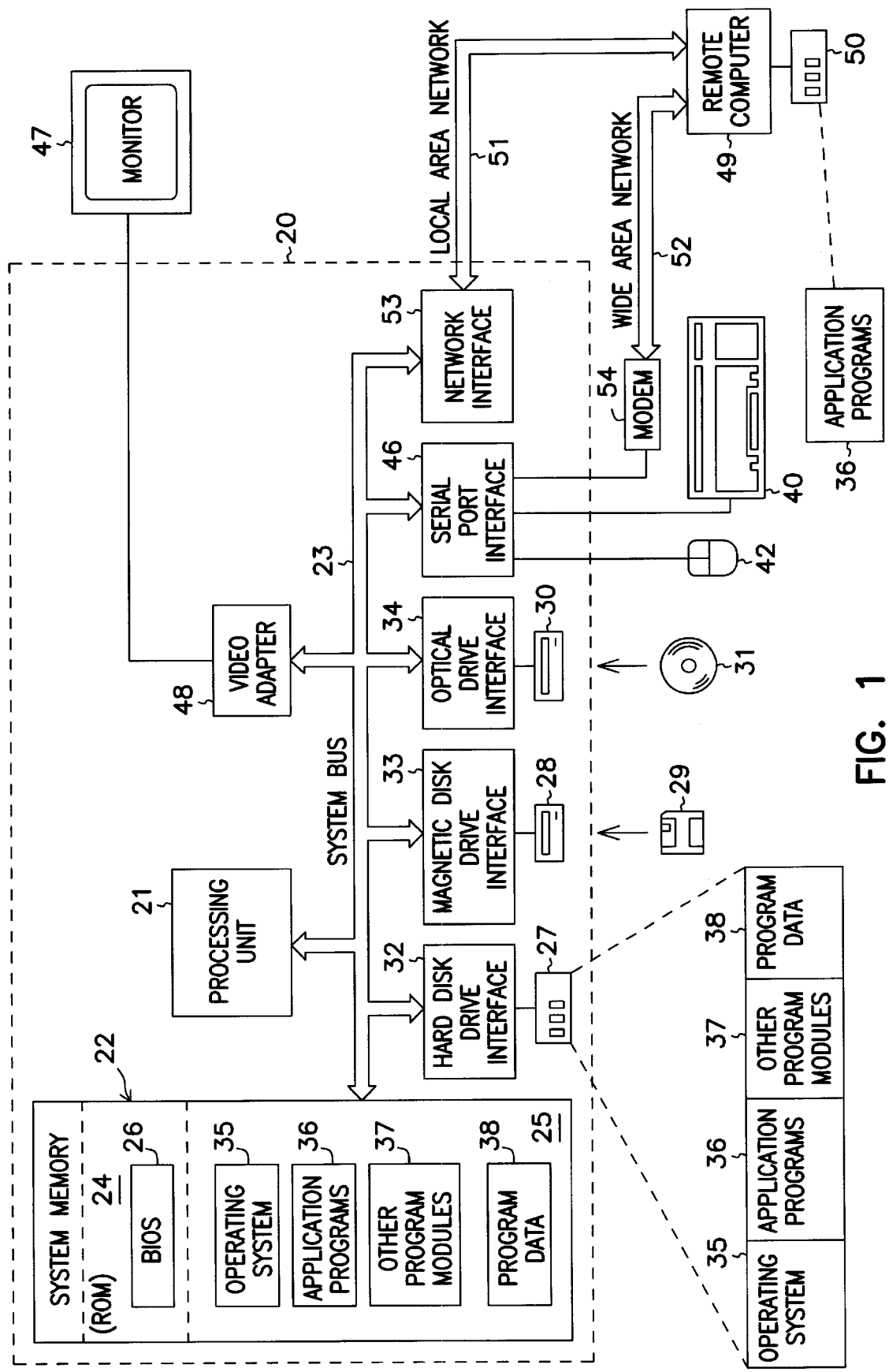
FIG. 1 illustrates a simplified overview of an example embodiment of a computing environment for the present invention.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored or encoded in a machine readable medium such as the hard disk, magnetic disk 29, optical disk 31, ROM 24, RAM 25, or an electrical signal such as an electronic data stream through a communications channel, including an operating system 35, one or more application programs 36, other program modules 37, and program data 38. As described below in more detail, operating system 35 may allocate memory such as RAM 25 into kernel-mode memory or user-mode memory. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Example Embodiments of the Invention

According to one example embodiment of the present invention, a hash table or other tracking mechanism is used during testing of a computer program to track which routines have been subjected to induced faults and exceptions. The hash table is consulted as routines are encountered while running a test workload to determine which routines have not been subjected to induced exceptions at a particular time. Because the hash table keeps track of which routines have been subjected to induced exceptions, the system can induce a more uniform distribution of exceptions for all routines, especially those that are encountered only rarely under typical operating conditions. Thus, the system is able to ensure proper exception handling by all routines.

It is to be understood that, while the particular embodiments discussed in the instant disclosure use a hash table, the techniques disclosed herein can be applied to a variety of data structures and other mechanisms that can be used to keep track of routines that have been subjected to induced exceptions. Thus, while the use of a hash table is described by way of example, the invention is not so limited.

Figure 2:
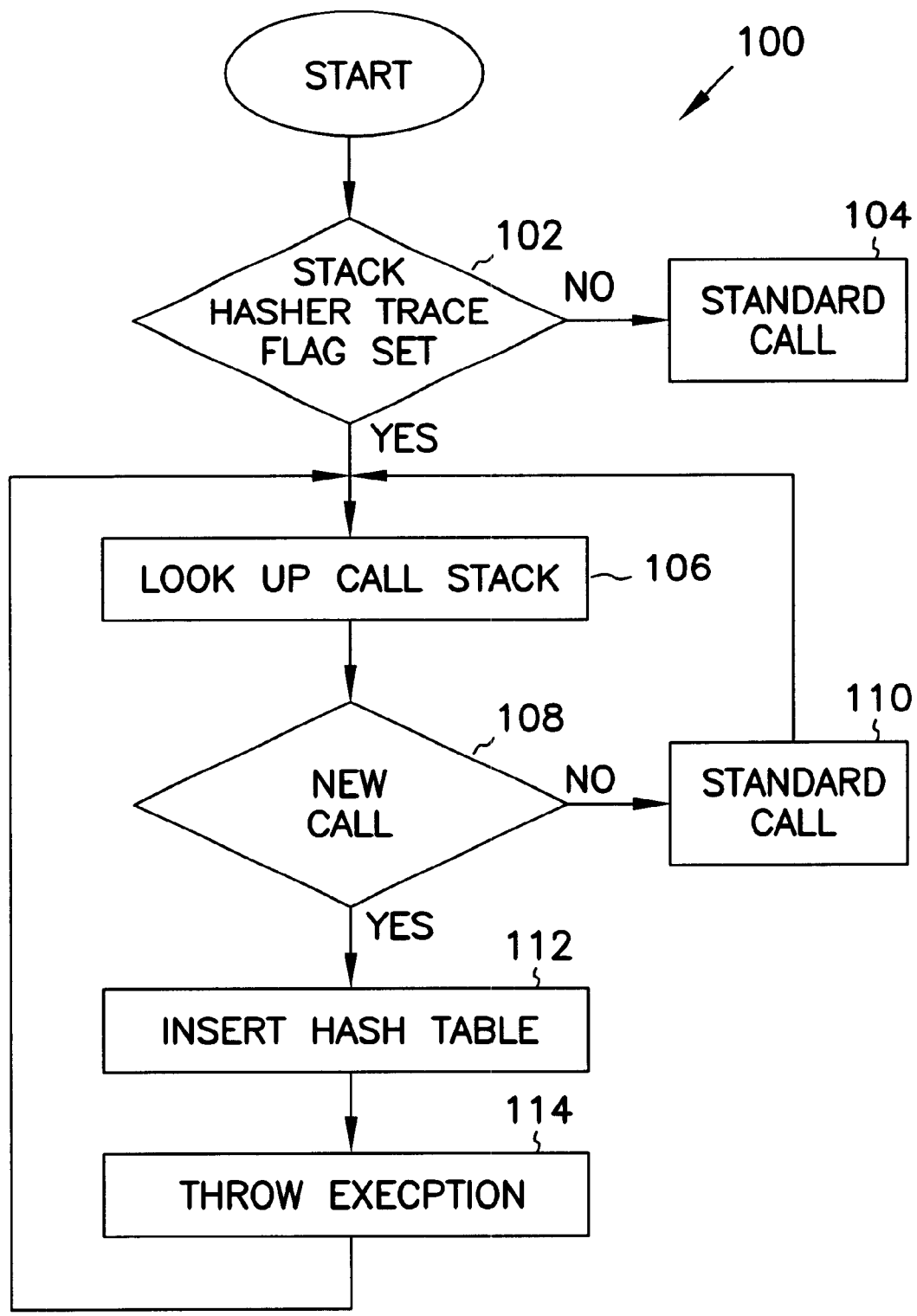
FIG. 2 is a flow chart illustrating an example embodiment of the present invention.

Referring again to the drawings, FIG. 2 is a flow chart depicting a method 100 for inducing exceptions in a uniformly distributed manner for several routines in a computer program, according to an example embodiment of the present invention. In this implementation, a call path analysis scheme is used to ensure that low level faults are induced exhaustively to each distinct call path during a broad spectrum workload. The call path analysis scheme is not affected by call frequency skew.

According to this scheme, low level routines that can throw exceptions are instrumented to evaluate the call path at each invocation. If a call path is found that has not yet had a fault induced, an entry is made in a hash table to record the fact that a fault has been induced for the call path, and the exception is thrown. This technique facilitates detecting programming errors that might otherwise lie dormant, and thus significantly and advantageously improves systems testing.

First, at a decision block 102, the system determines whether a trace flag has been set for the stack hasher process. If the trace flag has not been set, program execution continues normally, without testing for the ability of called routines to handle exceptions properly, as depicted at a block 104.

If, on the other hand, the trace flag has been set, execution proceeds to a block 106, at which a call stack is referenced that indicates a sequence of called routines. At a decision block 108, the system determines whether the routine in the call stack represents a new call path. If not, the routine is called and executed without having an exception thrown, as depicted at a block 110. Flow then returns to the block 106, and the system references and makes a similar determination concerning the next routine in the call stack.

If, at the decision block 108, it is determined that the routine does represent a new call path, flow instead proceeds to a block 112, at which an entry is inserted into the hash table to indicate that a fault has been induced for the call path. Next, at a block 114, the exception is thrown for the routine, and the system determines whether the exception was handled properly. Execution then returns to the block 106, and the system references and makes a similar determination concerning the next routine in the call stack.

Any of a variety of conventional programming techniques can be used to implement the fault induction code. For example, the following pseudocode segment illustrates one example approach to inducing faults:

```
IF (STACK_HASHER_TRACE_FLAG=TRUE)
  BEGIN
  context=NULL
  —Get callers program counter. Returns NULL
  —when no caller available
  caller_pc=GET_CALLER_PC (context)
  WHILE (caller_pc <> NULL)
  BEGIN
    IF (IS_IN_HASH_TABLE (caller_pc)=FALSE)
      BEGIN
      INSERT_IN_HASH_TABLE (caller_pc)
        THROW Disk_IO_Exception
      END caller_pc=GET_CALLER_PC (context)
    END
  END
```

Figure 3:
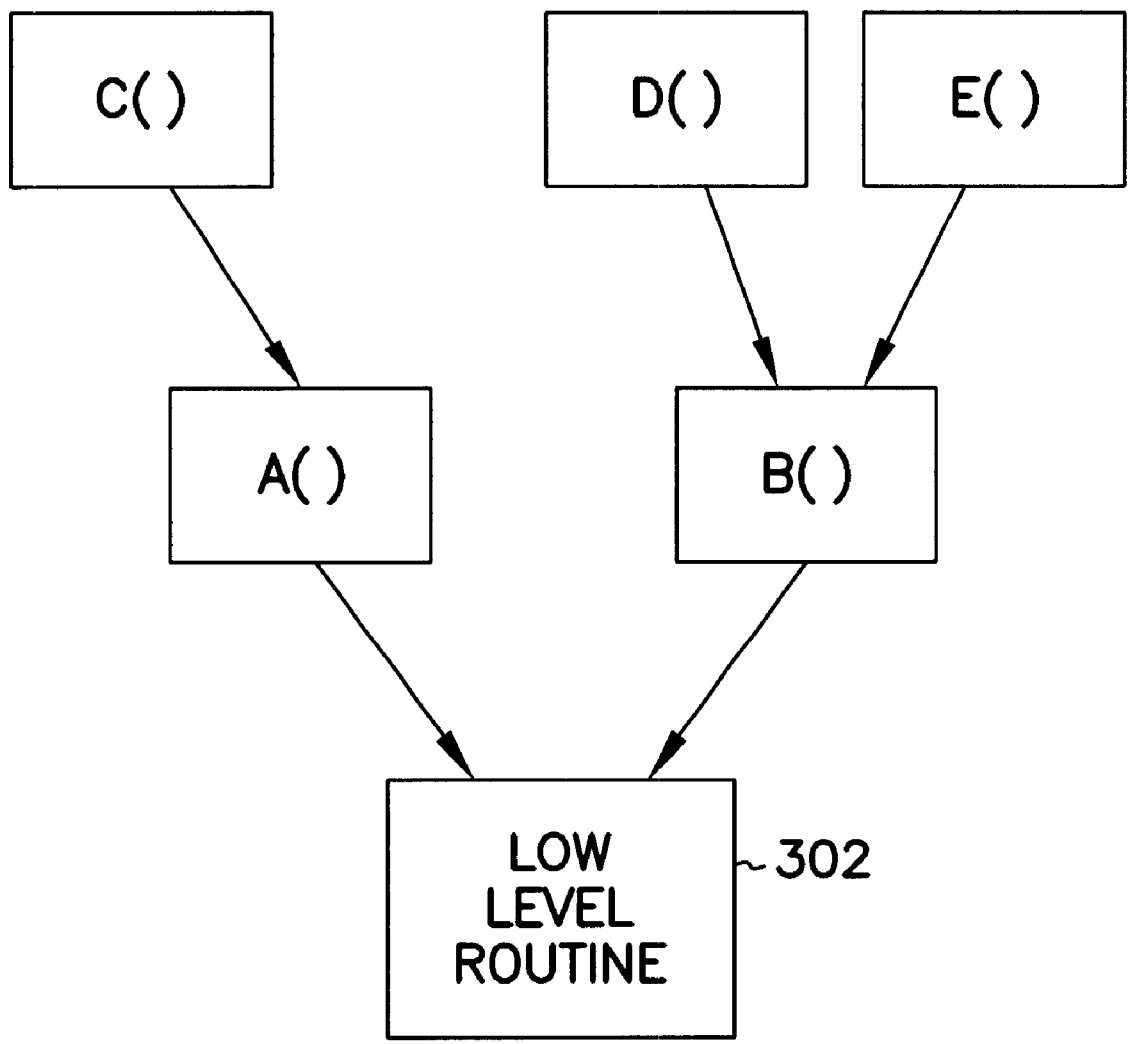
FIG. 3 conceptually illustrates organization of call paths according to a particular operational example of an embodiment of the present invention.

An understanding of the operation of this embodiment of the present invention can be gained through a discussion of a specific operation example. For these purposes, reference is made to FIG. 3, which is known as a reverse call graph or a caller's graph and conceptually depicts routines A( ), B( ), C( ), D( ), and E( ), a low level routine 302, and the call paths between them. The directions of the arrows indicate calling relationships. For example, in FIG. 3, routine C( ) calls routine A( ). Similarly, routines D( ) and E( ) both call routine B( ). Routines A( ) and B( ), in turn, both call the low level routine 302. Accordingly, FIG. 3 shows three call paths ending in the low level routine 302: C( ), A( ); D( ), B( ); and E( ), B( ).

The low level routine 302 can be any of a variety of low level routines, such as synchronization primitives, allocators, or input/output routines. Such routines typically handle the random faults that can arise from interactions with the underlying operating system. It will be appreciated by those skilled in the art that the particular relationships depicted in FIG. 3 are discussed by way of example only, and that any number of relationships are possible.

As a particular example, more than one low level routine 302 is typically present. For each low level routine 302 that can have rare exceptions thrown, a sequence of called routines exists that can reach the low level routine 302. This sequence can have any depth. Each edge of the caller's graph of FIG. 3 corresponds to a lower level routine from a call invocation. Each node in the caller's graph corresponds to a specific invocation instance of the subordinate routine. It will be appreciated that a single routine can produce multiple invocation instances of a particular subordinate routine and that a single low level routine can throw many distinct exception types. According to a particular implementation, each invocation point is identified by the instruction program address associated with the call. It should be noted, however, that this identification scheme is not mandatory, and that any scheme that uniquely identifies each invocation instance can be used.

For purposes of the instant discussion, it is assumed that the fault induction code is called by the other routines in the following order: D( ), E( ), C( ), C( ), D( ). When the fault induction code is called from routine D( ), the fault induction code references the call stack, per the block 106 of FIG. 2, and determines that it was called from routine B( ) and has not yet thrown an exception to routine B( ). Accordingly, pursuant to the blocks 112 and 114 of FIG. 2, an entry is made in a hash table that a fault has been thrown by routine B( ) and the fault is subsequently raised.

The entry that is made in the hash table uses the program address associated with each invocation point as a unique path identifier to determine whether the exception has been thrown in the context associated with the invocation instance. In this particular embodiment, with the hash table used for all of the invocation points, it is not necessary that all distinct paths from an invocation point to a lower level routine have faults induced. As an alternative, however, more information regarding the entire call path can be stored so that all distinct paths can have faults induced.

Next, when the fault induction code is called by routine E( ), the fault induction code again references the call stack and determines that it was called from routine B( ). Because the fault induction code has already raised a fault through routine B( ), it searches higher in the call stack and determines that routine B( ) is called from routine E( ). The fault induction code also determines that it has not thrown an exception from a call by routine E( ), so it adds an entry to the hash table and raises the exception.

Next, routine C( ) calls the fault induction code, which references the call stack and determines that it was called from routine A( ). Because the fault induction code has not yet raised a fault through routine A( ), it makes an entry in the hash table and raises the fault.

Routine C( ) then calls the fault induction code again. This time, the fault induction code determines that it has already raised a fault through the call path, and does not raise the fault again. Because the fault is not raised again, uniformity is improved in that frequently traversed call paths do not cause call path skew. Similarly, when routine D( ) calls the fault induction code, it determines that it has already raised a fault through the call path, and does not raise the fault again.

According to another particular embodiment of the present invention, a ring buffer is used to track the routine paths and to store associated parameters such that events leading up to unsuccessful handling of an induced exception or fault are preserved for examination purposes in debugging. In particular, indicators of the called routines are stored in a ring buffer. Storage stops when the system cannot handle an exception. In this manner, the ring buffer stores a history of the routines called immediately before the failure of the system to handle the exception. Alternatively, any data structure can be used to store this history.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine readable medium, such as a CD-ROM, magnetic medium, ROM or RAM, or in an electronic signal. Further, as used in the claims herein, the term "module" shall mean any hardware or software component, or any combination thereof.

What is claimed is:

1. A method for testing fault tolerance of a computer program having a plurality of routines, the method comprising:

executing the computer program;

maintaining a record of paths in the computer program that have been subjected to an induced exception;

inducing an exception if a path currently being executed has not already been subjected to an induced exception; and referencing a call stack to determine a sequence in which the plurality of routines are called.

2. The method of claim 1, further comprising storing context information relating to a called routine.

3. The method of claim 2, wherein the context information comprises at least one of a history of routines called and a parameter associated with a called routine.

4. The method of claim 2, wherein the context information is stored in a ring buffer.

5. The method of claim 1, further comprising using a program address to uniquely identify paths in the computer program that have been subjected to the induced exception.

6. A method for testing fault tolerance of a computer program having a plurality of routines and capable of being characterized by a set of call paths describing sequences in which the routines are called in the computer program, the method comprising:

determining individual call paths forming the set of call paths;

maintaining a hash table representing call paths that have been subjected to an induced exception, each such call path being uniquely identified by a program address;

in response to calling particular routines in a sequence described by a particular call path, referencing the hash table to determine whether the particular call path has been subjected to an induced exception; and if the particular call path has not yet been subjected to an induced exception, modifying the hash table to indicate that the particular call path has been subjected to an induced exception and issuing the induced exception to the particular call path.

7. The method of claim 6, further comprising referencing a call stack to determine a sequence in which the particular routines are called.

8. The method of claim 6, further comprising storing context information relating to a called routine.

9. The method of claim 8, wherein the context information comprises at least one of a history of routines called and a parameter associated with a called routine.

10. The method of claim 8, wherein the context information is stored in a ring buffer.

11. A computer-readable medium having computer-executable instructions stored thereon for:

executing a computer program having a plurality of routines;

maintaining a record of paths in the computer program that have been subjected to an induced exception;

inducing an exception if a path currently being executed has not already been subjected to an induced exception; and referencing a call stack to determine a sequence in which the plurality of routines are called.

12. A computer-readable medium, according to claim 11, having further computer-executable instructions stored thereon for storing context information relating to a called routine.

13. A computer-readable medium, according to claim 12, wherein the context information comprises at least one of a history of routines called and a parameter associated with a called routine.

14. A computer-readable medium, according to claim 12, wherein the context information is stored in a ring buffer.

15. A computer-readable medium, according to claim 11, having further computer-executable instructions for using a program address to uniquely identify paths in the computer program that have been subjected to the induced exception.

16. A computer-readable medium for testing fault tolerance of a computer program having a plurality of routines and capable of being characterized by a set of call paths describing sequences in which the routines are called in the computer program, the computer-readable medium having computer-executable instructions stored thereon for:

determining individual call paths forming the set of call paths;

maintaining a hash table representing call paths that have been subjected to an induced exception, each such call path being uniquely identified by a program address;

in response to calling particular routines in a sequence described by a particular call path, referencing the hash table to determine whether the particular call path has been subjected to an induced exception; and if the particular call path has not yet been subjected to an induced exception, modifying the hash table to indicate that the particular call path has been subjected to an induced exception and issuing the induced exception to the particular call path.

17. A computer-readable medium, according to claim 16, further having computer-executable instructions stored thereon for referencing a call stack to determine a sequence in which the particular routines are called.

18. A computer-readable medium, according to claim 16, further having computer-executable instructions stored thereon for storing context information relating to a called routine.

19. A computer-readable medium, according to claim 18, wherein the context information comprises at least one of a history of routines called and a parameter associated with a called routine.

20. A computer-readable medium, according to claim 18, wherein the context information is stored in a ring buffer.

21. A computer arrangement for testing fault tolerance of a computer program having a plurality of routines, the computer arrangement configured to:

execute the computer program;

maintain a record of paths in the computer program that have been subjected to an induced exception;

induce an exception if a path currently being executed has not already been subjected to an induced exception; and reference a call stack to determine a sequence in which the plurality of routines are called.

22. A computer arrangement, according to claim 21, further configured to store context information relating to a called routine.

23. A computer arrangement, according to claim 22, wherein the context information comprises at least one of a history of routines called and a parameter associated with a called routine.

24. A computer arrangement, according to claim 22, wherein the context information is stored in a ring buffer.

25. A computer arrangement, according to claim 21, further configured to use a program address to uniquely identify paths in the computer program that have been subjected to the induced exception.

26. A computer arrangement for testing fault tolerance of a computer program having a plurality of routines and capable of being characterized by a set of call paths describing sequences in which the routines are called in the computer program, the computer arrangement configured to:

determine individual call paths forming the set of call paths;

maintain a hash table representing call paths that have been subjected to an induced exception, each such call path being uniquely identified by a program address;

in response to calling particular routines in a sequence described by a particular call path, reference the hash table to determine whether the particular call path has been subjected to an induced exception; and if the particular call path has not yet been subjected to an induced exception, modify the hash table to indicate that the particular call path has been subjected to an induced exception and issuing the induced exception to the particular call path.

27. A computer arrangement, according to claim 26, further configured to reference a call stack to determine a sequence in which the particular routines are called.

28. A computer arrangement, according to claim 26, further configured to store context information relating to a called routine.

29. A computer arrangement, according to claim 28, wherein the context information comprises at least one of a history of routines called and a parameter associated with a called routine.

30. A computer arrangement, according to claim 28, wherein the context information is stored in a ring buffer.

* * * * *